US010962817B2

(12) United States Patent
Zhao et al.

(10) Patent No.: US 10,962,817 B2
(45) Date of Patent: Mar. 30, 2021

(54) LIQUID CRYSTAL DISPLAY PANEL AND LIQUID CRYSTAL DISPLAY DEVICE

(71) Applicant: Shanghai Tianma Micro-Electronics Co., Ltd., Shanghai (CN)

(72) Inventors: Jian Zhao, Shanghai (CN); Zhidan Su, Shanghai (CN)

(73) Assignee: SHANGHAI TIANMA MICRO-ELECTRONICS CO., LTD., Shanghai (CN)

(*) Notice: Subject to any disclaimer, the term of this patent is extended or adjusted under 35 U.S.C. 154(b) by 148 days.

(21) Appl. No.: 16/100,252

(22) Filed: Aug. 10, 2018

(65) Prior Publication Data

US 2019/0353940 A1  Nov. 21, 2019

(30) Foreign Application Priority Data

May 18, 2018  (CN) .......................... 201810483328.1

(51) Int. Cl.
*G02F 1/1333* (2006.01)
*G02F 1/1335* (2006.01)
(Continued)

(52) U.S. Cl.
CPC .. *G02F 1/133382* (2013.01); *G02F 1/133512* (2013.01); *G02F 1/134309* (2013.01); *G02F 1/136286* (2013.01)

(58) Field of Classification Search
None
See application file for complete search history.

(56) References Cited

U.S. PATENT DOCUMENTS

| 4,093,355 A * | 6/1978 | Kaplit ............... G02F 1/133382 |
| | | 219/209 |
| 2005/0083443 A1* | 4/2005 | Lee ................... G02F 1/133382 |
| | | 349/21 |

(Continued)

FOREIGN PATENT DOCUMENTS

| CN | 202362552 U | 8/2012 |
| CN | 103631044 A | 3/2014 |

(Continued)

OTHER PUBLICATIONS

Extended European Search Report dated Oct. 18, 2019 for corresponding EP Application No. 19174297.2.

(Continued)

*Primary Examiner* — Phu Vu
(74) *Attorney, Agent, or Firm* — Tarolli, Sundheim, Covell & Tummino LLP

(57) ABSTRACT

A liquid crystal display panel and a liquid crystal display device are provided. The liquid crystal display panel includes: a first substrate, a second substrate arranged opposite to the first substrate, and a liquid crystal layer sandwiched between the first substrate and the second substrate, in which a heating electrode is arranged on a side of the first substrate facing towards the liquid crystal layer. Heat generated by the heating electrode can directly act on liquid crystal molecules in the liquid crystal layer, so that the liquid crystal display panel can be quickly started and a response of the liquid crystal molecules in the liquid crystal layer can be accelerated in a low temperature environment, thereby guaranteeing the display quality of the liquid crystal display device in the low temperature environment.

9 Claims, 14 Drawing Sheets

(51) Int. Cl.
G02F 1/1343 (2006.01)
G02F 1/1362 (2006.01)

(56) References Cited

U.S. PATENT DOCUMENTS

| | | | |
|---|---|---|---|
| 2006/0055859 A1 | 3/2006 | Hyun | |
| 2010/0296040 A1* | 11/2010 | Han | G02F 1/134363 349/139 |
| 2014/0055696 A1* | 2/2014 | Lee | G02F 1/133382 349/20 |
| 2014/0152933 A1 | 6/2014 | Anupongongarch | |
| 2015/0286105 A1* | 10/2015 | Sugimoto | G02F 1/133707 349/143 |
| 2015/0346572 A1* | 12/2015 | Hirosawa | G02F 1/134309 349/43 |
| 2016/0178980 A1 | 6/2016 | Zheng | |

FOREIGN PATENT DOCUMENTS

| | | |
|---|---|---|
| CN | 104932162 A | 9/2015 |
| EP | 2700996 A2 | 2/2014 |

OTHER PUBLICATIONS

Chinese Office Action dated Aug. 24, 2020, and English translation thereof, for Chinese application No. 201810483328.1.

* cited by examiner

LIQUID CRYSTAL DISPLAY PANEL AND LIQUID CRYSTAL DISPLAY DEVICE

CROSS-REFERENCE TO RELATED APPLICATIONS

The present application claims priority to Chinese Patent Application No. 201810483328.1, filed on May 18, 2018, the content of which is incorporated herein by reference in its entirety.

TECHNICAL FIELD

The present disclosure relates to the field of display technologies and, particularly, relates to a liquid crystal display panel and a liquid crystal display device that can be operated in a wide range of low temperatures.

BACKGROUND

Since liquid crystal display devices for military or on-vehicle display are often used in special operating conditions, they are required to have a wide range of adaptable ambient temperature, and sometimes even are required to operate normally in a temperature range of −20° C. to 55° C. However, since viscosity coefficient and threshold voltage of liquid crystal material increase, response becomes slow at a low temperature, or even liquid crystal crystallization phenomenon occurs, the liquid crystal display devices cannot operate normally at low temperature. The wide-temperature type liquid crystal display device (produced by SHARP Corporation) has a low temperature normal operating point of −10° C., while a normal-temperature type liquid crystal display device has a low temperature normal operating point of −5° C. Below the above low temperature normal operating points, the response of the liquid crystal display device may be slow down. Therefore, in the development of the liquid crystal display devices for military or on-vehicle display, measures must be taken to widen the low temperature operating range of the liquid crystal display device, in order to ensure its normal operation in a low temperature environment.

SUMMARY

The present disclosure provides a liquid crystal display panel and a liquid crystal display device, which can solve the problems of a too low response speed of the liquid crystal display panel and the liquid crystal display device when operating at a low temperature.

In a first aspect of the present disclosure, a liquid crystal display panel is provided. The liquid crystal display panel includes a first substrate, a second substrate arranged opposite to the first substrate, and a liquid crystal layer arranged between the first substrate and the second substrate. The first substrate includes a first underlay, a plurality of gate lines and a plurality of data lines arranged on the first underlay. The plurality of gate lines extends along a first direction and is arranged along a second direction, the plurality of data lines extends along the second direction and is arranged along the first direction, and the plurality of gate lines and the plurality of data lines intersect to define a plurality of sub-pixels. The first substrate further includes a first electrode layer having a first electrode, a second electrode layer having a second electrode, and a heating electrode located at a side of the first underlay facing towards the liquid crystal layer. In each of the plurality of sub-pixels, the first electrode comprises a plurality of strip electrodes that are parallel to one another, and the second electrode layer is located between the first electrode layer and the first underlay.

In a second aspect of the present disclosure, a liquid crystal display device including the above liquid crystal display panel is provided.

BRIEF DESCRIPTION OF DRAWINGS

In order to more clearly explain the embodiments of the present disclosure or the technical solution in the related art, the drawings to be used in the description of the embodiments or the related art will be briefly described below. Obviously, the drawings in the following description are some embodiments of the present disclosure. For those skilled in the art, other drawings may also be obtained based on these drawings without paying any creative labor.

DESCRIPTION OF EMBODIMENTS

In order to make the objectives, technical solutions, and advantages of the present disclosure more apparent, the technical solutions of the present disclosure will be further clearly described by embodiments with reference to the accompanying drawings. Obviously, the described embodiments are part of the embodiments of the present disclosure, but not all of the embodiments. Other embodiments obtained by those persons skilled in the art based on the embodiments of the present disclosure without creative efforts shall fall within the protection scope of the present disclosure.

A liquid crystal display panel provided by an embodiment of the present disclosure includes: a first substrate, a second substrate arranged the first substrate, and a liquid crystal layer sandwiched between the first substrate and the second substrate. A heating electrode is arranged on a side of the first substrate facing towards the second substrate, i.e., the heating electrode is arranged inside the liquid crystal display panel. Heat generated by the heating electrode can directly act on liquid crystal molecules in the liquid crystal layer. Therefore, a purpose of quickly starting the liquid crystal display panel in a low temperature environment is realized, a response of the liquid crystal molecules in the liquid crystal layer under the low temperature environment can be accelerated, so as to guarantee the display quality of the liquid crystal display device and solve the problem of too slow response of the liquid crystal display panel and the liquid crystal display device when operating under the low temperature environment.

Figure 1:
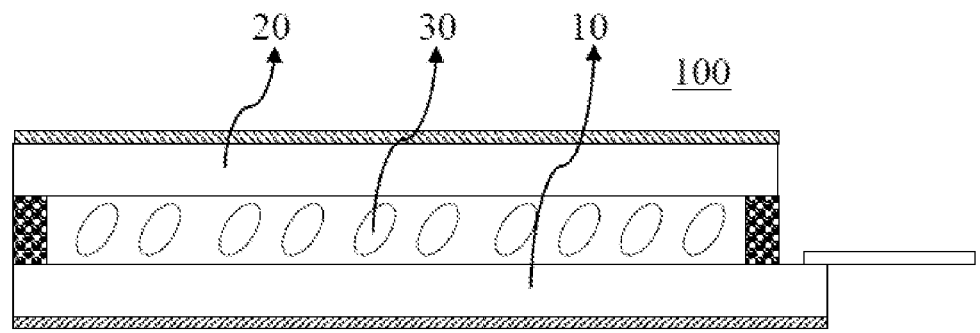
FIG. 1 is a structural schematic diagram of a liquid crystal display panel according to an embodiment of the present disclosure.

FIG. 1 is a structural schematic diagram of a liquid crystal display panel according to an embodiment of the present disclosure. As shown in the FIG. 1, the liquid crystal display panel 100 includes: a first substrate 10, a second substrate 20 arranged opposite to the first substrate 10, and a liquid crystal layer 30 located in a box-like space formed by the first substrate 10 and the second substrate 20 sealed with peripheral sealant, thus realizing image display under effect of an external electric field.

In an embodiment of the present disclosure, the first substrate 10 may be, for example, an array substrate including a first underlay and a driving array formed on the first underlay. A driving electric field is generated in a driving signal and acts on the liquid crystal layer 30. The second substrate 20 may be, for example, a color film substrate including a second underlay and a color filtering layer formed on the second underlay. Liquid crystal molecules in the liquid crystal layer 30 undergo a state change under the driving electric field, such that light is blocked or allowed to pass through the color filtering layer located above the liquid crystal layer 30, thereby presenting different colors and grayscales and realizing image display. Of course, the embodiments of the present disclosure are not limited thereto. For example, the color filtering layer may also be located on the first substrate, or no color filtering layer is provided in the liquid crystal display panel, so as to only display a black-and-white image.

Figure 2:
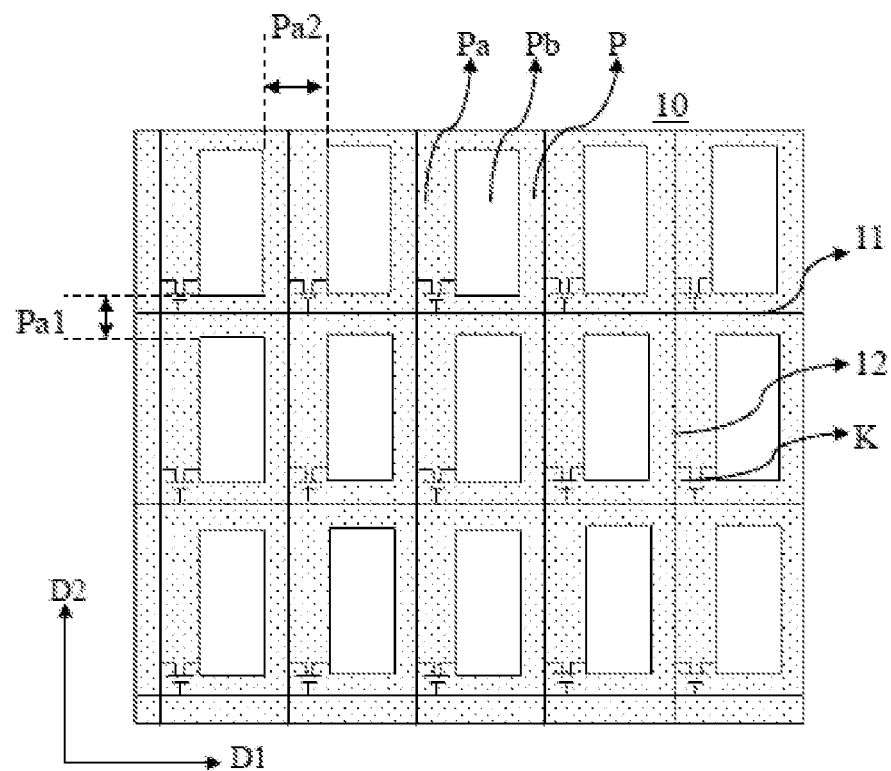
FIG. 2 is a structural schematic diagram of a first substrate in a liquid crystal display panel according to an embodiment of the present disclosure.
Figure 3:
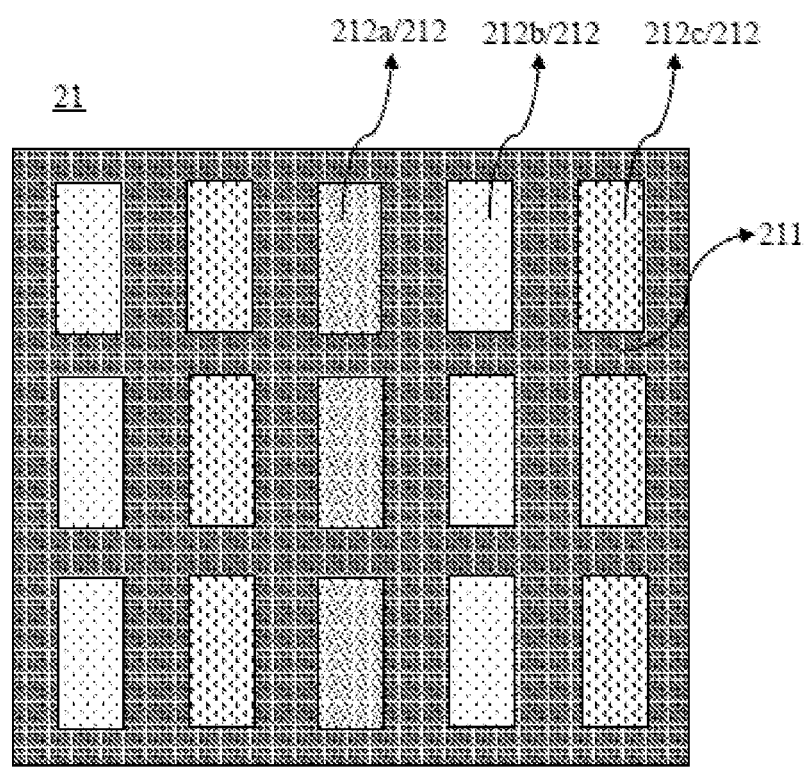
FIG. 3 is a schematic diagram of a color filtering layer in a liquid crystal display panel according to an embodiment of the present disclosure.
Figure 4:
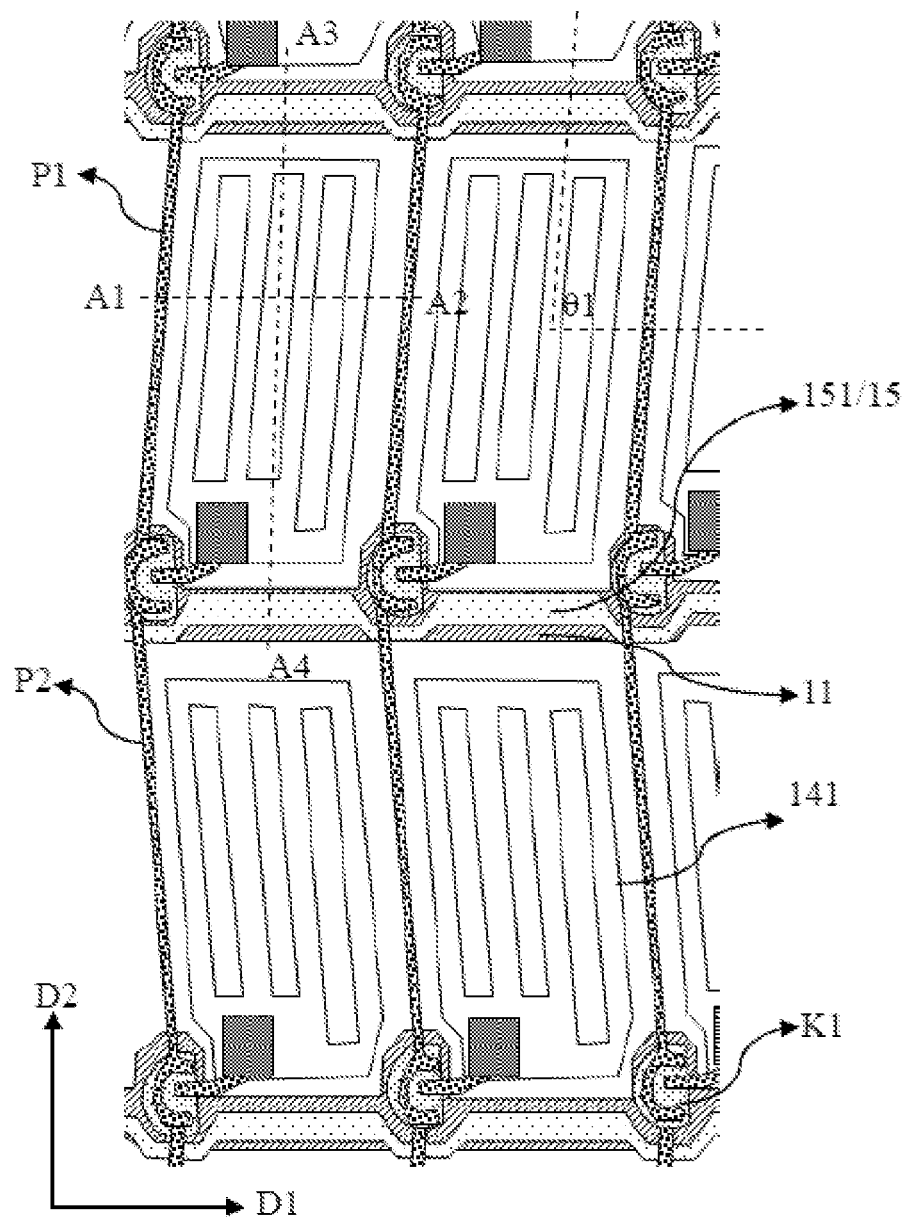
FIG. 4 is a partially enlarged view of the first substrate shown in FIG. 2.
Figure 5:
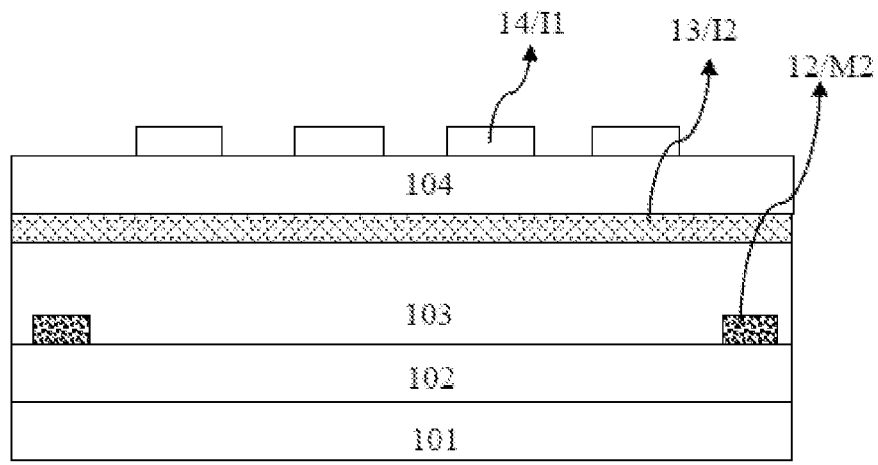
FIG. 5 is a sectional view taken along line A1-A2 in FIG. 4.
Figure 6:
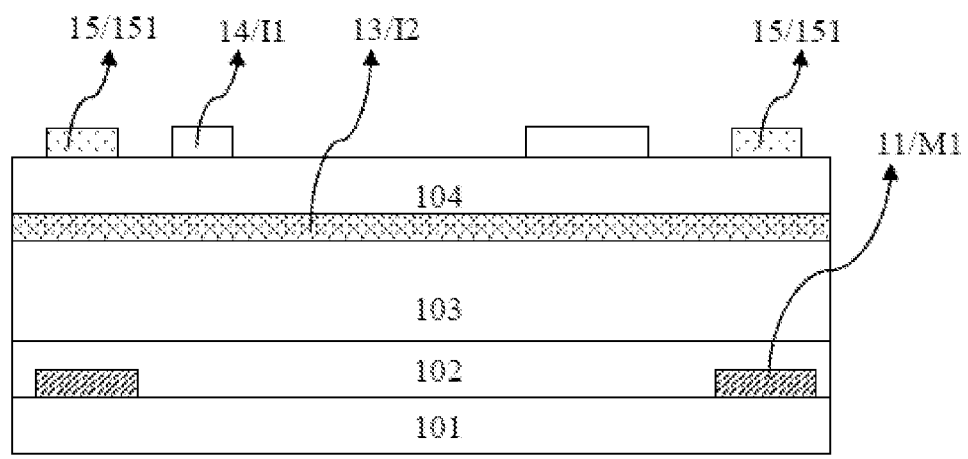
FIG. 6 is a sectional view along line A3-A4 in FIG. 4.

The array substrate as the first substrate 10 is illustratively described below. FIG. 3 is a schematic diagram of a color filtering layer in a liquid crystal display panel according to an embodiment of the present disclosure, FIG. 4 is a partially enlarged view of the first substrate shown in FIG. 2, FIG. 5 is a sectional view taken along line A1-A2 in FIG. 4, and FIG. 6 is a sectional view along line A3-A4 in FIG. 4.

In the present embodiment, the first substrate 10 is an array substrate including a first underlay 101 and a driving array formed on the first underlay 101. The above driving array includes a plurality of gate lines 11 and a plurality of data lines 12 sequentially arranged on the first underlay 101. The plurality of gate lines 11 extends along a first direction D1 and is arranged along a second direction D2. The plurality of data lines 12 extends along the second direction D2 and is arranged along the first direction D1. The plurality of gate lines 11 and the plurality of data lines 12 intersect in an insulation manner to define a plurality of sub-pixels P. In the present embodiment, the first direction D1 and the second direction D2 are, for example, a row direction and a column direction, respectively. The plurality of sub-pixels P includes a plurality of rows of sub-pixels P and a plurality of columns of sub-pixels P. A same data line 12 is connected to a same column of sub-pixels P. A same gate line 11 is connected to a same row of sub-pixels P. Each sub-pixel P is provided with a pixel electrode and at least one display switch element K. The display switch element K may be, for example, a thin film transistor. The thin film transistor has a gate electrode connected to a corresponding gate line 11, a source electrode connected to a corresponding data line 12, and a drain electrode connected to its associated pixel electrode. The first substrate 11 further includes a driving integrated circuit (not shown), which transmits a scanning signal for each of the sub-pixels P through the gate lines 11 and transmits a data signal for each of the sub-pixels P through the data lines 12.

The first substrate 10 further includes a plurality of light-transmitting regions Pb and a non-light-transmitting region Pa arranged around the light-transmitting regions Pb. Each light-transmitting region Pb is located in each sub-pixels P, allowing light to pass through so as to display an image. The non-light-transmitting region Pa includes a first strip non-light-transmitting region Pa1 extending in the first direction D1 and a second strip non-light-transmitting region Pa2 extending in the second direction D2. The first strip non-light-transmitting region Pa1 is located between two adjacent rows of the light-transmitting regions Pb, and spaces the two adjacent rows of the light-transmitting regions Pb. The second strip non-light-transmitting region Pa2 is located between two adjacent columns of the light-transmitting regions Pb, and spaces the two adjacent columns of the light-transmitting regions Pb. In other words, multiple first strip non-light-transmitting regions Pa1 and multiple second strip non-light-transmitting regions Pa2 intersect to form the plurality of light-transmitting regions Pb arranged in an array, and the plurality of light-transmitting regions Pb is located in the plurality of sub-pixels P arranged in an array, respectively. The gate line 11 and the data line 12 are located in the first strip non-transmitting region Pa1 and the second strip non-transmitting region Pa2, respectively.

Further, the liquid crystal display panel 100 further includes a color filtering layer 21. The color filtering layer 21 includes a plurality of color filters 212 and a black matrix 211 arranged around the color filter 212. The plurality of color filter 212 may include, for example, a first color filter 212*a*, a second color filter 212*b*, and a third color filter 212*c*. The first color filter 212*a*, the second color filter 212*b*, and the third color filter 212*c* have different colors, and are arranged in the corresponding light-transmitting regions Pb of the sub-pixels P, respectively. The first color filter 212*a*, the second color filter 212*b* and the third color filter 212*c* can be, for example, a red color filter, a green color filter and a blue color filter, respectively, and form a pixel unit together with three adjacent corresponding sub-pixels P. The black matrix 211 is located between adjacent color filters 212 to space the adjacent color filters 212 apart so as to prevent color mixing. Meanwhile, the black matrix 211 is arranged to correspond to the non-light-transmitting region Pa on the first substrate 10. The gate lines 11 and the data lines 12 are located in the non-light-transmitting region Pa, i.e., the gate lines 11 and the data lines 12 are located within the coverage of the black matrix 211, thereby preventing light leakage. The color filtering layer 21 also can be located on the second substrate 20, and an orthographic projection of the black matrix 211 on the first substrate 10 overlaps the non-light-transmitting region Pa. It is also possible that the color filtering layer 21 is located on the first substrate 10, and the coverage of the black matrix 211 forms the non-transmitting regions Pa, which is not specifically limited in the embodiments of the present disclosure.

Further, in the present embodiment, the first substrate 10 further includes a heating electrode 15 located at a side of the first underlay 101 facing towards the liquid crystal layer 30. Regarding the structures of the driving array and the heating electrode 15 of the first substrate 10, please refer to FIGS. 4-6. The first substrate 10 includes a first underlay 101, a first metal layer M1, a second metal layer M2, a passivation layer 103, a second electrode layer I2, and a first electrode layer I1. The first metal layer M1 is located at the side of the first underlay 101 facing towards the liquid crystal layer, and includes a plurality of gate lines 11 and gate electrodes of the display switch elements K. The plurality of gate lines 11 is connected to the gate electrodes of the corresponding display switch elements K, respectively. The second metal layer M2 is located above the first metal layer M1, and spaced from the first metal layer M1 in an insulation manner through a gate insulation layer 102. The second metal layer M2 includes a plurality of data lines 12, the source electrodes and drain electrodes of the display switch elements K, and the plurality of data lines 12 is connected to the source electrodes of the corresponding display switch elements K, respectively. The passivation layer 103 covers the second metal layer M2 to exert functions of insulation and spacing, and can achieve a planarization of segment gap formed by the gate line 11 and the data line 12. The second electrode layer I2 is located on the passivation layer 103 and includes a second electrode 13. The first electrode layer I1 is located above the second electrode layer I2 and is spaced from the second electrode layer I2 in an insulation manner through an insulation spacer layer 104. The first electrode layer I1 includes a first electrode 14. In each sub-pixel, the first electrode 14 includes a plurality of strip electrodes 141. The first electrode layer I1 and the second electrode layer I2 are made of a transparent conductive material, for example, a transparent metal oxide material such as indium tin oxide, for increasing the transmittance of the liquid crystal display panel. The first substrate 10 further includes an active layer. The active layer overlaps the gate electrode of the display switch element K in a region which forms a channel region K1 of the display switch element between the source electrode and the drain electrode of the display switch element K.

In the present embodiment of the present disclosure, the first electrode 14 is a pixel electrode. For example, each pixel electrode may connect to the drain electrode of the corresponding display switch element K via a through-hole penetrating the insulation spacer layer 104, the second electrode layer I2 and the passivation layer 103. In an operating process, when the gate line 11 provides a scan signal, the first electrode 14 receives data signal. The second electrode 13 is a common electrode. For example, the common electrode may be connected to a common signal source of the driving integrated circuit directly or through a common signal line. The second electrode 13 receives a common signal and operates together with the pixel electrode to generate a parallel electric field in the liquid crystal display panel, which subsequently results in a change in molecular state of the liquid crystal molecules, thereby allowing or blocking passage of light. Upon displaying, under control of a driving voltage provided by the pixel electrode and the common electrode, the light passes through the light-transmitting region of each sub-pixel, then passes through the liquid crystal layer between the first substrate and the second substrate, and finally is emitted through the color filters corresponding to each sub-pixel. Therefore, a color display is realized and thus an image is displayed.

In the present embodiment of the present disclosure, the expression "the first electrode 14 is a pixel electrode, and the second electrode 13 is a common electrode" is merely illustrative. It is also possible that the first electrode 14 is a common electrode, and the second electrode 13 is a pixel electrode, which are not limited in the embodiments of the present disclosure.

Further, the first substrate 10 further includes a heating electrode 15. The heating electrode 15 includes a plurality of strip heating electrodes located in the non-light-transmitting region. For example, the plurality of strip heating electrodes may extend over the entire display area of the liquid crystal display panel along the extending direction of the first strip non-light-transmitting region Pa1, as far as the heating power interface located in the non-display area of the liquid crystal display panel. The plurality of strip heating electrodes may be connected to the heating power interface directly or through a signal line. Due to a temperature rise under the effect of direct current voltage provided by the heating power interface, the liquid crystal molecules in the liquid crystal display panel can be pre-heated or the liquid crystal molecules keep operate at a certain temperature. The plurality of strip heating electrodes may be respectively connected to different heating power interfaces or connected to a same heating power interface, which is not limited in the embodiments of the present disclosure. Compared to a heating manner of providing a heating sheet outside the liquid crystal display panel, by arranging the heating electrode inside the liquid crystal display panel according the embodiments of the present disclosure, the heat generated by the heating electrode can directly act on the liquid crystal molecules in the liquid crystal layer, thereby greatly increasing the heating speed. In this way, the liquid crystal display panel can be quickly started in a low temperature environment, the response of the liquid crystal molecules in the liquid crystal layer in a low temperature environment can be accelerated, and the display quality of the liquid crystal display device can be guaranteed. Therefore, the problem of too slow response of the liquid crystal display panel and the liquid crystal display device when operating in a low temperature environment can be solved.

Moreover, in the present embodiment, the heating electrode 15 is arranged in the non-light-transmitting region, in order to reduce the capacitive coupling effect of the heating electrode 15 and other conductive layers on the state change of the liquid crystal molecules in the light-transmitting region from being changed. In other words, even if there is the capacitive coupling effect of the heating electrode 15 and other conductive layers, the capacitive coupling effect only appears within the coverage of the black matrix, and stray light generated by the state change of the liquid crystal molecules in this region is blocked by the black matrix. Thus, the influence on the image display effect is absent or insignificant. Therefore, the influence of introducing the heating electrode on the display effect of the liquid crystal display panel can be reduced as much as possible.

The heating electrode 15 may be formed in a same layer as the first electrode 14 or formed by using a same mask plate or in a same exposure process. In this way, the introduction of the heating electrode 15 would not increase number of layers of the liquid crystal display panel, thereby reducing the thickness of the liquid crystal display panel. Meanwhile, an additional new mask is unnecessary to be introduced during the manufacturing process, a number of manufacturing processes will not be increased, so that the manufacturing cost can be reduced.

In the embodiment of the present disclosure, the first substrate can adopt a pseudo-dual-domain structure as shown in FIG. 4. In each sub-pixel P, the first electrode 14 includes a plurality of strip electrodes 141 connected to each other and arranged in parallel. For example, the plurality of strip electrodes 141 may be formed by slitting on the first electrode 14. An angle θ1 between the extending direction of the strip electrode 141 and the first direction D1 satisfies 45°<θ1<90°. The plurality of sub-pixels P includes a first sub-pixel P1 and a second sub-pixel P2 arranged adjacently in the second direction D2. The strip electrodes 141 in the first sub-pixel P1 and the strip electrodes 141 in the second sub-pixel P2 are symmetrically arranged with respect to the first direction D1. Such design can provide a wider viewing angle than a single-domain technology, thereby meeting the user's ever-increasing requirements on display quality. In the embodiment of the present disclosure, the heating electrode 15 includes a plurality of first strip heating electrodes 151 extending along the first direction D1 and located between two adjacent rows of sub-pixels or located in the first strip non-light-transmitting region between two adjacent rows of light-transmitting regions. The plurality of first strip heating electrodes 151 bypasses the channel region K1 of the display switch element such that the heat generated by the heating electrode is prevented from directly acting on the channel region K1 and thus performance of the display switch element is prevented from being impaired.

On the first substrate with the above pseudo-dual-domain structure, since the strip electrodes 141 in the first sub-pixel P1 and the strip electrodes 141 in the second sub-pixel P2 are symmetrically arranged with respect to the first direction D1, the liquid crystal molecules at a junction between the strip electrodes 141 in the first sub-pixel P1 and the strip electrodes 141 in the second sub-pixel P2 are subjected to the electric fields generated by the upper and lower portions of the first electrode, where the electric fields counteract one another. In this way, rotation directions of the liquid crystal molecules at this place are slightly disordered compared with those in the light-transmitting regions, and a phenomenon of black domain lines occurs. The phenomenon of black domain lines can be improved by widening the non-light-transmitting region or widening the black matrix. In the embodiment of the present disclosure, the first strip heating electrodes 151 are within the range of the non-light-transmitting region, so that the width of the first strip heating electrodes 151 can be increased to improve the heating effect, and the influence of introducing the heating electrode on the display effect can be further reduced at the same time.

In an embodiment of the present disclosure, the gate line 11 at least partially overlaps the first strip heating electrode 151. In another embodiment of the present disclosure, the first strip heating electrodes 151 are located within the coverage of the gate lines 11, so that introduction of the first strip heating electrodes 151 may not lead to an increase in the width of the corresponding non-light-transmitting region, thereby reducing or eliminating the influence of introducing the heating electrode on an aperture ratio of the liquid crystal display panel.

Figure 7:
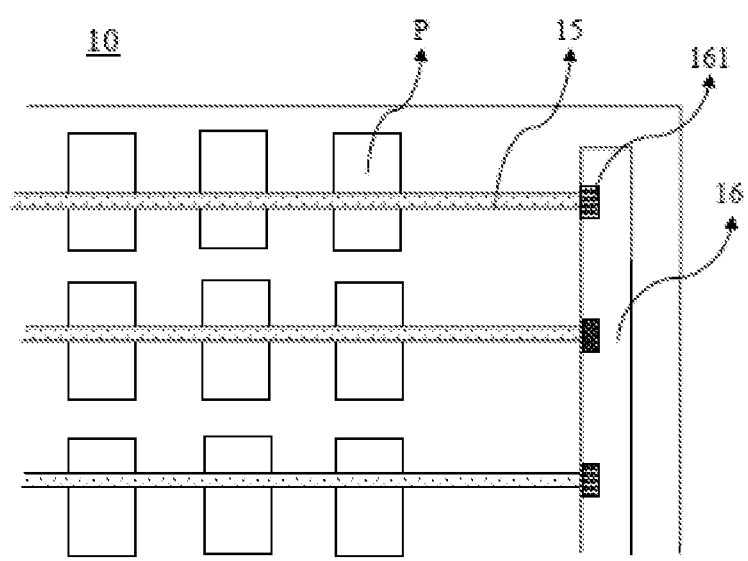
FIG. 7 is another partially enlarged view of the first substrate shown in FIG. 2.

FIG. 7 is another partial enlarged view of the first substrate shown in FIG. 2. As shown in FIG. 7, a heating electrode 15 is connected to a heating control module 16. The heating control module 16 provides a heating potential to the heating electrode 15 so as to realize heating. For example, the heating control module may be arranged in a peripheral non-display area of the first substrate, or may be arranged on an overall driving circuit board for the liquid crystal display panel. It is also possible to arrange the heating control module on a separate driving circuit for a heating structure, which is not limited in the present disclosure. For example, the plurality of strip heating electrodes may extend over the entire display area of the liquid crystal display panel along the extending direction of the first strip non-light-transmitting region Pa1 as far as the heating control module. The plurality of strip heating electrodes is respectively connected to a heating power interface 161 in the heating control module, and is heated up under the direct current voltage provided by the heating power interface 161, such that the liquid crystal molecules in the liquid crystal display panel can be pre-heated or the liquid crystal molecules keep normally operating at a certain temperature. The operating process of the liquid crystal display panel includes, for example, a standby phase (in which the liquid crystal display device where the liquid crystal display panel is located is in a shutdown state, i.e., in a non-operating state), a pre-starting phase (in which the liquid crystal display device where the liquid crystal display panel is located is to be started but not yet started, the liquid crystal display panel needs to be pre-heated so as to improve the starting speed and the display effect of the liquid display device at a low temperature, or in which the liquid crystal display panel is in a pre-heating state), and an operating phase (in which the pre-heating has been finished, and the liquid crystal display device has been started and is in an operating state). In the pre-starting stage, the heating electrode is connected to the heating potential interface on the heating control module, so as to enter the operating state. Meanwhile, the heat generated by the heating electrode is used to heat the display panel. Compared to the heating manner of arranging the heating sheet outside the liquid crystal display panel, by arranging the heating electrode inside the liquid crystal display panel according to the embodiments of the present disclosure, the heat is directly applied to the liquid crystal layer, the heating speed is increased, and the starting speed at the low temperature environment is improved. Further, during the operating phase of the liquid crystal display panel in a special operating environment, the liquid crystal display panel can be continuously heated as required, such that the liquid crystal molecules in the liquid crystal layer are maintained at a suitable operating temperature, thereby reducing a viscous resistance thereof, accelerating the state change of the liquid crystal molecules, alleviating a tailing phenomenon of the display image, and improving the display quality of the liquid crystal display device.

In an embodiment of the present disclosure, for example, a temperature sensor and a heating controller (not shown) may be arranged in the liquid crystal display panel. When the temperature sensor detects that the temperature of the liquid crystal display panel is lower than a preset temperature value, the heating controller controls the heating control module, thereby controlling the heating electrode to heat the liquid crystal display panel for maintaining the normal operation.

Figure 8:
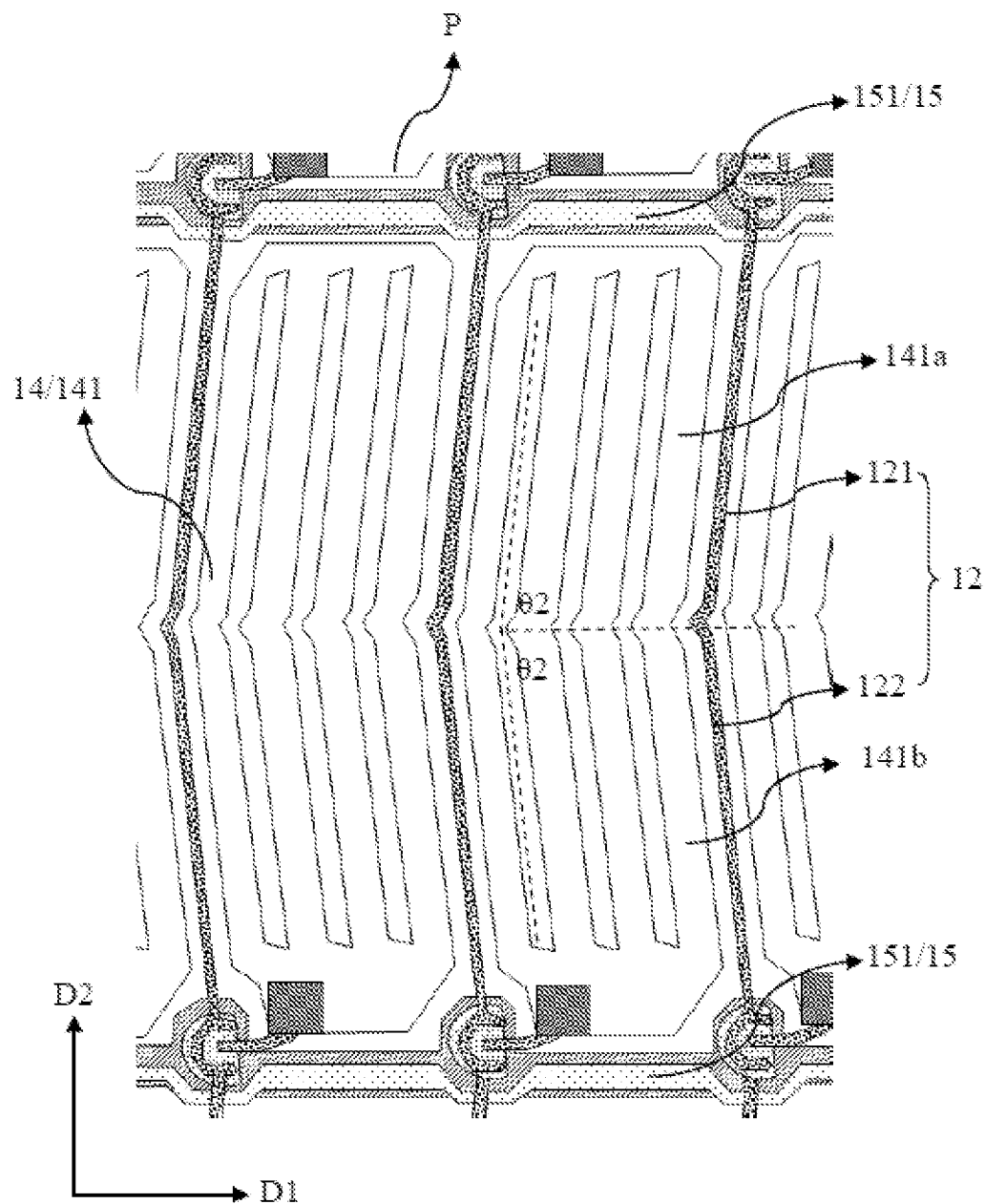
FIG. 8 is a schematic diagram of a first substrate according to another embodiment of the present disclosure.

FIG. 8 is a schematic diagram of a first substrate according to another embodiment of the present disclosure. In the embodiment of the present disclosure, the first substrate adopts the dual-domain structure as shown in FIG. 8. In each sub-pixel P, a first electrode 14 includes a plurality of strip electrodes 141 arranged in parallel. Each of the plurality of strip electrodes 141 includes a first branch electrode 141a and a second branch electrode 141b connected to each other. An angel θ2 between an extending direction of the first branch electrode 141*a* and the first direction D1 satisfies 45°<02<90. The second branch electrode 141*b* and the first branch electrode 141*a* are symmetrically arranged with respect to the first direction. Such design can provide a wider viewing angle than the single-domain technology so as to meet the increasing requirements of users on the display quality. In the embodiment of the present disclosure, the heating electrode 15 includes a plurality of first strip heating electrodes 151 extending along the first direction D1. The plurality of first strip heating electrodes 151 is located between two adjacent rows of sub-pixels P, or is located in the first strip non-light-transmitting region between two adjacent rows of light-transmitting regions. The plurality of first strip heating electrodes 151 bypasses the channel region of the display switch element, thereby reducing the influence on the display effect.

In the embodiment of the present disclosure, a part of each data line 12 corresponding each sub-pixel P, includes a first branch line 121 and a second branch line 122 connected to each other. An extending direction of the first branch line 121 is parallel to an extending direction of the first branch electrode 141*a*. An extending direction of the second branch line 122 is parallel to an extending direction of the second branch electrode 141*b*, so that the data line 12 forms a Z-shaped trace extending in the second direction D2.

Figure 9:
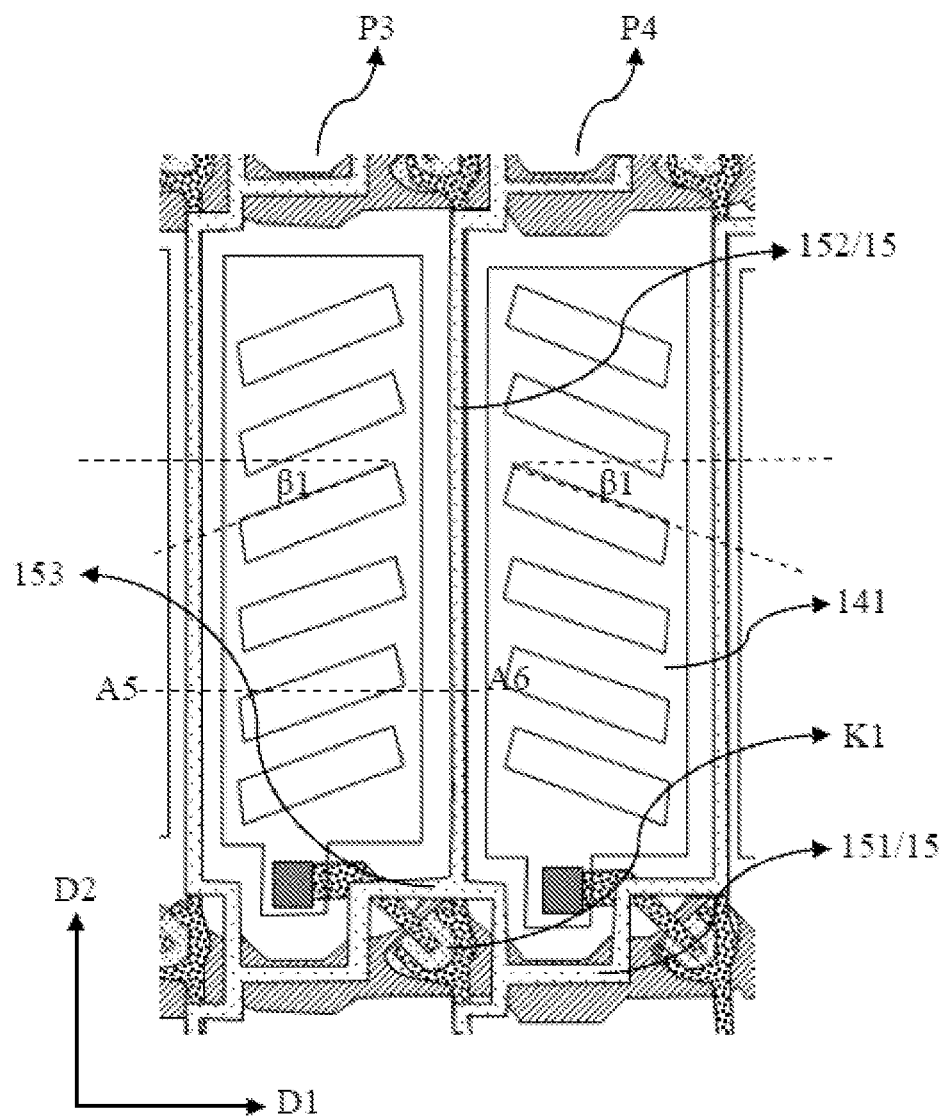
FIG. 9 is a schematic diagram of a first substrate according to yet another embodiment of the present disclosure.
Figure 10:
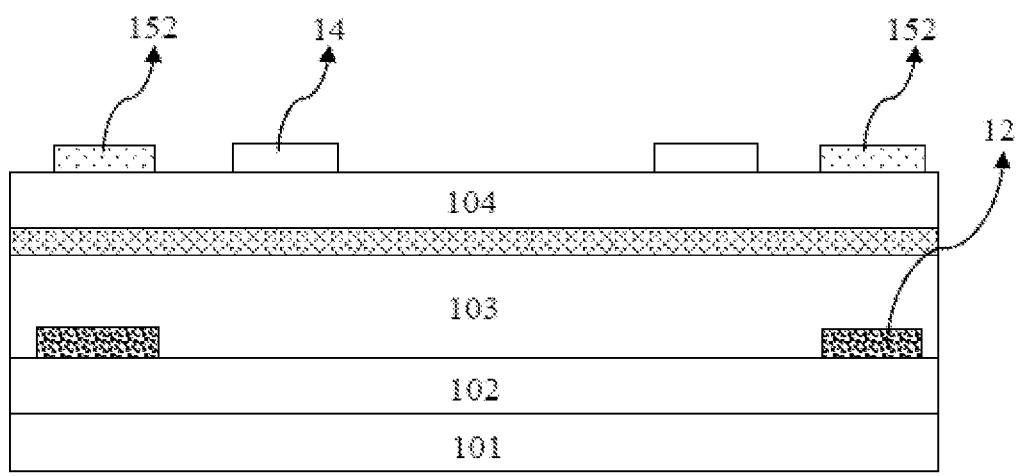
FIG. 10 is a sectional view taken along line A5-A6 in FIG. 9.

FIG. 9 is a schematic diagram of a first substrate according to yet another embodiment of the present disclosure, and FIG. 10 is a sectional view taken along line A5-A6 in FIG. 9. In an embodiment of the present disclosure, the first substrate may adopt the pseudo-dual domain structure as shown in FIG. 8. Specifically, in each sub-pixel P, the first electrode 14 includes a plurality of strip electrodes 141 arranged in parallel. An angle β1 between the extending direction of the strip electrode 141 and the first direction D1 satisfies 0°<β1<45°. The plurality of sub-pixels P includes a third sub-pixel P3 and a fourth sub-pixel P4 adjacently arranged along the first direction D1. The strip electrodes 141 in the third sub-pixel P3 and the strip electrodes 141 in the fourth sub-pixel P4 are symmetrically arranged with respect to the second direction D2. Such design can provide a wider viewing angle than the single-domain technology and meets the user's ever-increasing requirements on display quality. In the present embodiment of the present disclosure, the heating electrode 15 includes a plurality of second strip heating electrodes 152 extending along the second direction D2. The plurality of second strip heating electrodes 152 is located between two adjacent columns of sub-pixels or located in the second strip non-light-transmitting region between two adjacent columns of light-transmitting regions, and bypasses the channel region of the display switch element. On the first substrate adopting the pseudo-dual-domain structure, since the strip electrodes 141 in the third sub-pixel P3 and the strip electrodes 141 in the fourth sub-pixel P4 are symmetrically arranged with respect to the second direction D2, the liquid crystal molecules at the junction between the strip electrodes 141 in the third sub-pixel P3 and the strip electrodes 141 in the fourth sub-pixel P4 are subjected to the electric fields generated by the left and right parts of the first electrodes 14, where the electric fields counteract one another. In this way, rotation directions of the liquid crystal molecules in this region are slightly disordered compared with those in the light-transmitting region, and a phenomenon of black domain lines occurs. The phenomenon of black domain lines can be improved by widening the non-light-transmitting region or widening the black matrix to form an actual non-light-transmitting region. In the embodiment of the present disclosure, the second strip heating electrodes 152 are within the range of the non-light-transmitting region, so that the width of the first strip heating electrodes 151 can be increased to improve the heating effect, and the influence of introducing the heating electrode on the display effect can be further reduced at the same time.

In the embodiment of the present disclosure, the data line 12 at least partially overlaps the second strip heating electrode 152 so that introduction of the second strip heating electrodes 152 will not lead to an increase in the width of the non-light-transmitting region where the second strip heating electrodes 152 are located, thereby reducing or eliminating the influence of introducing the heating electrode on the aperture ratio of the liquid crystal display panel.

In the present embodiment of the present disclosure, the heating electrode 15 may further include a plurality of first strip heating electrodes 151 extending along the first direction D1 and located in the first strip non-light-transmitting region. For example, the first strip heating electrodes 151 and the second strip heating electrodes 152 can be formed in a same layer with a same material, and connected to each other to form a heating electrode 15 having a grid structure, so as to increase a distribution area of the heating electrode and improve the speed and uniformity of heating. In addition, the heating electrode 15 may be located in the non-light-transmitting region and bypass the channel region K1 of the display switch element, so as to prevent the performance of the display switch element from being impaired by the heat generated by the heating electrode directly acting on the channel region K1. Regarding the portion corresponding to each sub-pixel, the heating electrode further includes a plurality of connecting portions 153 around the display switch element. The first strip heating electrode 151 extends in the non-light-transmitting region along the first direction D1 and is connected to the connection portion 153 when extending to the vicinity of the display switch element. The second strip heating electrode 152 between the adjacent sub-pixels is connected to the corresponding connection portion 153. The plurality of first strip heating electrodes 151 and the plurality of second strip heating electrodes 152 are connected to one another through a plurality of connecting portions 153, so as to form a grid-like heating electrode.

In the embodiment of the present disclosure, the first electrode 14 is a pixel electrode, the second electrode 13 is a common electrode, and the heating electrode 15 is formed in a same layer as the pixel electrode. However, the present invention is not limited thereto. In an embodiment of the present disclosure, the first electrode is a common electrode, the second electrode is a pixel electrode, and the heating electrode is formed in the same layer as the pixel electrode. Therefore, the introduction of the heating electrode will not lead to an increase of number of layers in the structure of the liquid crystal display panel, thereby reducing the thickness of the liquid crystal display panel. Meanwhile, an additional mask is unnecessary to be introduced during the manufacturing process, so that the manufacture steps will not be increased, and the production cost can be reduced.

Figure 11:
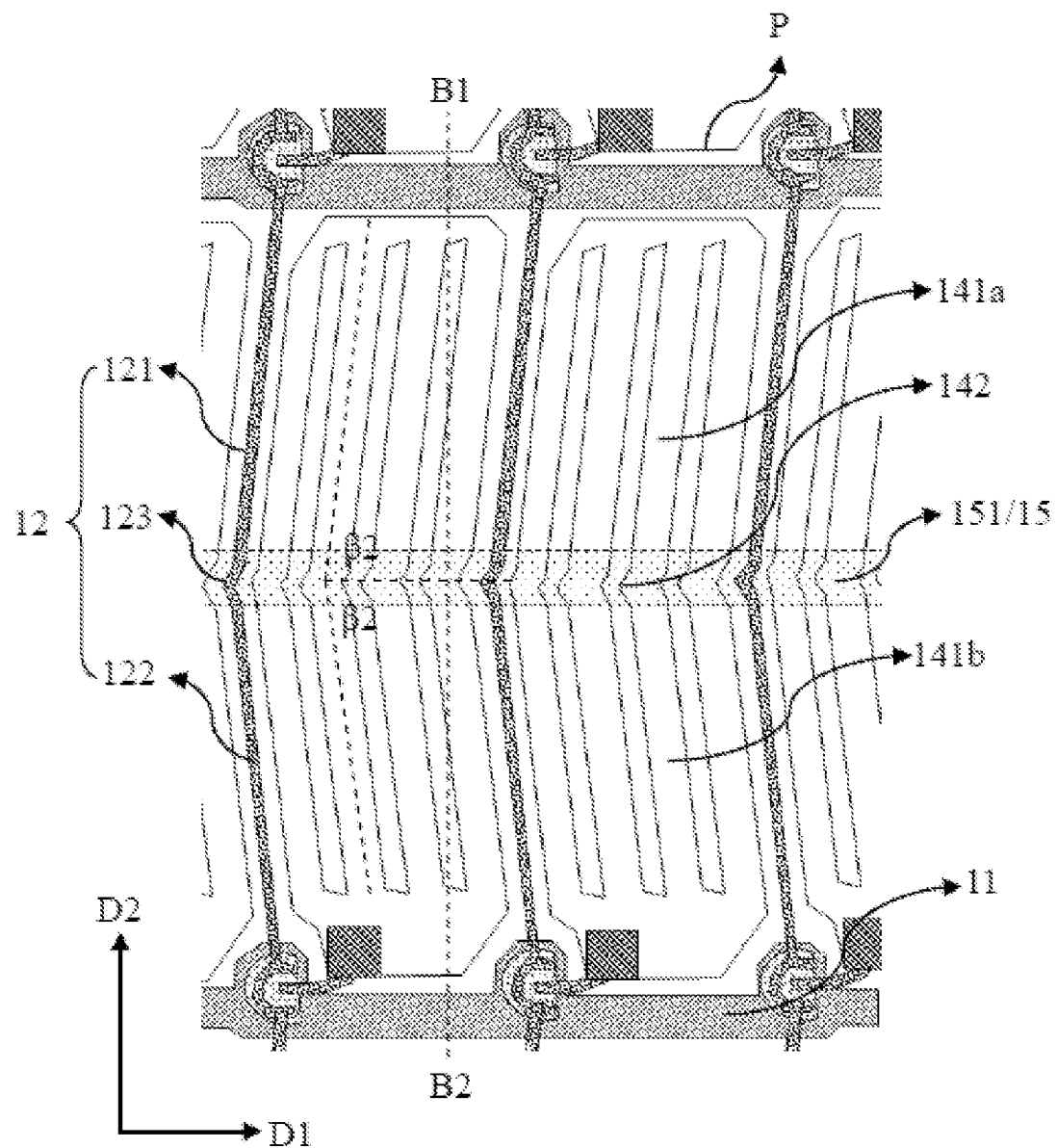
FIG. 11 is a schematic diagram of a first substrate according to yet another embodiment of the present disclosure.
Figure 12:
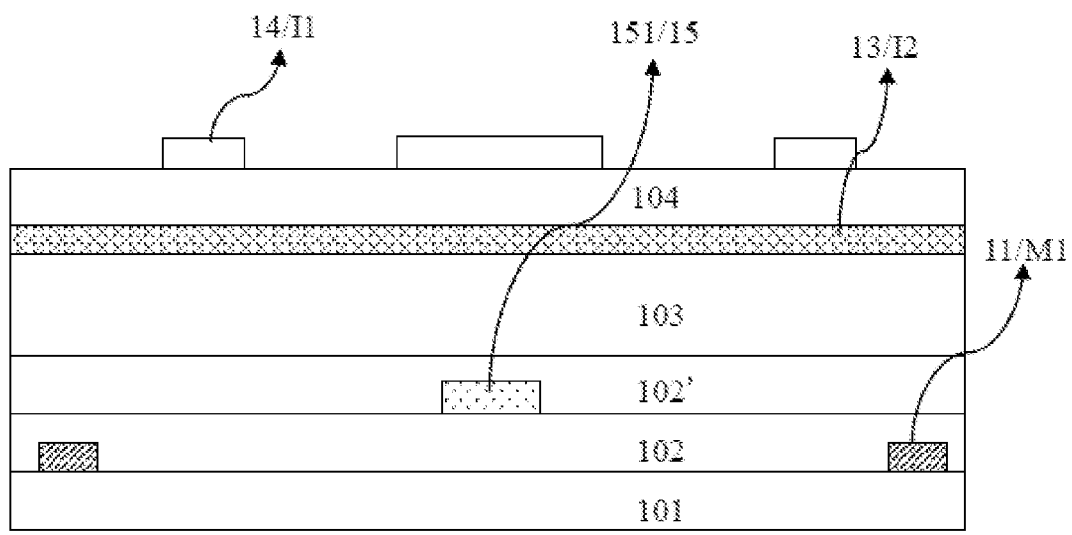
FIG. 12 is a sectional view taken along line B1-B2 in FIG. 11.

FIG. 11 is a schematic diagram of a first substrate according to yet another embodiment of the present disclosure, and FIG. 12 is a sectional view taken along line B1-B2 in FIG. 11. The first substrate includes a plurality of light-transmitting regions and a non-light-transmitting region around the light-transmitting regions. Each of the light-transmitting regions Pb is located in each of the sub-pixels P, and the gate lines 11 and the data lines 12 are located in the non-light-transmitting region. In the embodiment of the present disclosure, the first substrate includes a first electrode layer I1 and a second electrode layer I2. The second electrode layer I2 is located between the first electrode layer I1 and the first underlay 101, or the second electrode layer I2 is located at a side of the first electrode layer I1 facing away from the liquid crystal layer. The first electrode layer I1 includes a first electrode 14, and the second electrode layer I2 includes a second electrode 13. The first electrode 14 is a pixel electrode and is connected to a drain electrode of the corresponding display switch element. The second electrode 13 is a common electrode. The pixel electrode and the common electrode can generate a parallel electric field along a plane where the first substrate is located under the effect of an external driving signal. The first substrate further includes a heating electrode 15. At least a portion of the heating electrode 15 is located in the light-transmitting region of the first substrate. The layer where the heating electrode 15 is located is disposed between the second electrode layer I2 and the first underlay 101. In a shielding effect of the second electrode layer I2, even if there is a coupling electric field between the heating electrode 15 and other conductive layers, the parallel electric field of the liquid crystal display panel is not affected. For example, the layer where the heating electrode 15 is located may be located between the second electrode layer I2 and the first metal layer M1, is spaced from the second electrode layer I2 in an insulation manner through the passivation layer 104, and is spaced from the first metal layer M1 in an insulation manner through the gate insulation layer 102. Further, a second metal layer (not shown) for arranging the data lines 12 may be arranged between the layer where the heating electrode 15 is located and the first metal layer M1. The second metal layer is arranged between the gate insulation layer 102 and the layer where the heating electrode 15 is located, and is spaced from the layer where the heating electrode 15 is located in an insulation manner through an insulation interlayer 102'.

In the present embodiment of the present disclosure, in each of the sub-pixels P, the first electrode 14 includes a plurality of strip electrodes 141 connected to each other and arranged in parallel. For example, the plurality of strip electrodes 141 may be formed by slitting on the first electrode 14. Each strip electrode 141 includes a first branch electrode 141a and a second branch electrode 141b connected to each other. An angle β2 between an extending direction of the first branch electrode 141a and the first direction D1 satisfies 45°<β2<90°. The second branch electrode 141b and the first branch electrode 141a are symmetrically arranged with respect to the first direction D1. The first branch electrode 141a and the second branch electrode 141b of a same strip electrode 141 form a first corner 142 at the junction therebetween. The heating electrode 15 includes a plurality of first strip heating electrodes 151 extending in the first direction D1 and arranged in the second direction D2. In a same row of sub-pixels P, the vertices of the first corners 142 in all the sub-pixels are located in coverage of a same first strip heating electrode 151. In other words, the first strip heating electrode 151 is located at the junction between the first branch electrode 141a and the second branch electrode 141b, extends along the junctions in a same row of sub-pixels P and extends over the whole display area of the liquid crystal display panel. On the first substrate adopting the above pseudo-dual-domain structure, since the first branch electrode 141a and the second branch electrode 141b are symmetrically arranged with respect to the first direction D1, the liquid crystal molecules at the junction between the first branch electrode 141a and the second branch electrode 141b are subjected to the electric fields generated by the upper and lower portions of the first electrode, where the electric fields counteract one another. In this way, rotation directions of the liquid crystal molecules at the junction are slightly disordered compared with those in the light-transmitting region, or even no longer rotate along the electric field, and a phenomenon of black domain lines occurs to form a non-light-transmitting region. In the embodiment of the present disclosure, the first strip heating electrodes 151 are arranged in the non-light-transmitting region, so that influence of introducing heating electrode on the display effect can be further reduced while realizing a purpose of heating. In other words, the introduction of the heating electrode will not reduce area of the light-transmitting region, so that the introduction of the heating electrode will not affect the aperture ratio of the liquid crystal display panel.

In an embodiment of the present disclosure, for example, the material of the heating electrode 15 may be metal or metal oxide, which is not limited in the embodiments of the present disclosure. Since the heating electrode 15 is located in the non-light-transmitting region, the aperture ratio of the liquid crystal display panel is not affected even if the material of the heating electrode 15 is a light-shielding metal.

In order to be adapted to the above pseudo-dual-domain structure, a portion of the data line 12 corresponding to each sub-pixel P includes a first branch line 121 and a second branch line 122 connected to each other. The first branch line 121 is parallel to the first branch electrode 141a, and the second branch line 122 is parallel to the second branch electrode 142b. The first branch line 121 and the second branch line 122 of a same data line 12 form a second corner 123 at the junction therebetween. The presence of the second corner 123 may widen the width of the strip non-light-transmitting region in which the data line 12 is located, in particular when the data line 12 is made of the light-shielding metal, so that the aperture ratio of the liquid crystal display panel will be affected. Therefore, in the embodiment of the present disclosure, in a same row of sub-pixels P, the second corner 123 has a same shape as that of the first corner 142, and the vertices of all the second corners 123 and the vertices of all first corners 142 are located in the coverage of a same first strip heating electrode 151. Further, in a same row of sub-pixels P, the shape of the second corner 123 is same as that of the first corner 142, and the vertices of all the second corners 123 and the vertices of all first corners 142 are located on a same line extending along the first direction D1, so that the second corner 123 is located at the junction between the first branch electrode 141a and the second branch electrode 141b. In this way, the presence of the second corner 123 will not increase the area of the non-transmission of the liquid crystal display panel, and the aperture ratio of the liquid crystal display panel may not be affected while realizing a wide viewing angle by forming a pseudo-dual-domain structure.

Figure 13:
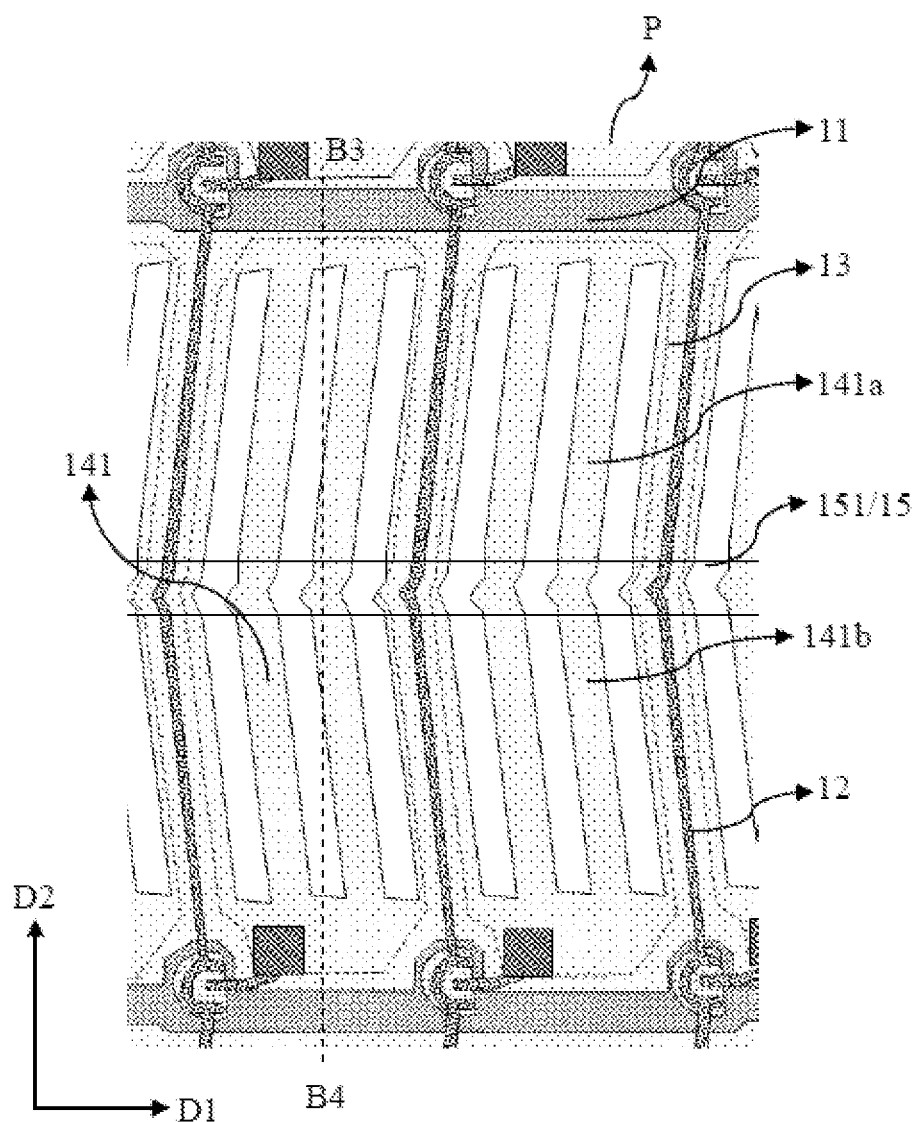
FIG. 13 is a schematic diagram of a first substrate according to yet another embodiment of the present disclosure.
Figure 14:
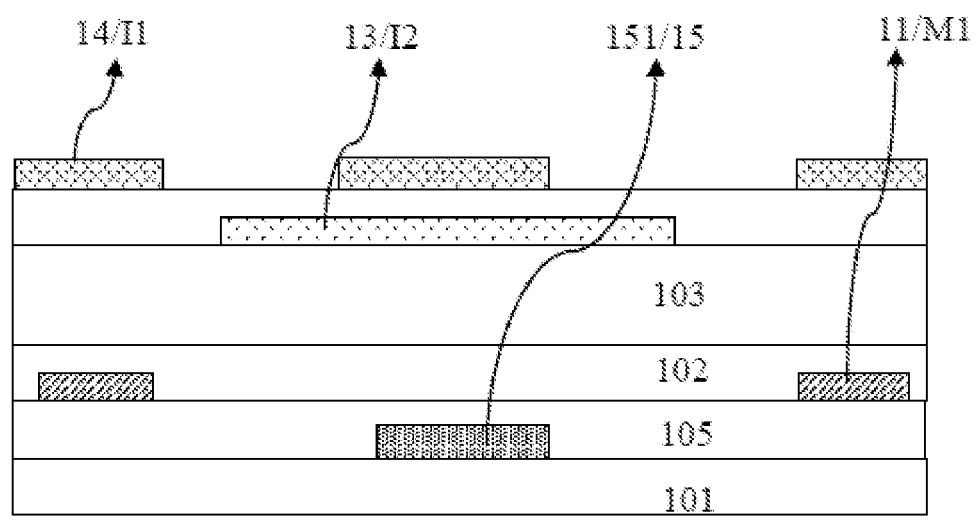
FIG. 14 is a sectional view taken along line B3-B4 in FIG. 13.

FIG. 13 is a schematic diagram of a first substrate according to yet another embodiment of the present disclosure, and FIG. 14 is a sectional view taken along line B3-B4 in FIG. 13. The structure of the first substrate provided in this embodiment is similar to that of the first substrate as shown in FIGS. 11 and 12. The first substrate includes a first electrode layer I1 and a second electrode layer I2. The second electrode layer I2 is located between the first electrode layer I1 and the first underlay 101, or the second electrode layer I2 is located at a side of the first electrode layer I1 facing away from the liquid crystal layer. The first electrode layer I1 includes a first electrode 14, and the second electrode layer I2 includes a second electrode 13.

The first substrate further includes a heating electrode 15, and at least part of the heating electrode 15 is located in the light-transmitting region of the first substrate. The layer where the heating electrode 15 is located is disposed between the second electrode layer I2 and the first underlay 101. Under the shielding effect of the second electrode layer I2, the parallel electric field of the liquid crystal display panel will not be affected even if there is a coupling electric field between the heating electrode 15 and other conductive layers. The difference lies in that: the first electrode 14 is a common electrode and may receive a common signal, for example, by being connected to a common signal source of the driving circuit directly or through a common signal line. The common electrode may be, for example, a full-surface type. A plurality of strip electrodes 141 are formed in each sub-pixel P through slitting. The second electrode 13 is a pixel electrode, and the second electrode layer I2 includes a plurality of pixel electrodes correspondingly located in the plurality of sub-pixels P respectively. Each sub-pixel is connected to the drain electrode of the corresponding display switch element K. The common electrode and the pixel electrode operate together to generate a parallel electric field in the liquid crystal display panel, and the liquid crystal molecules are driven to change their molecular state, thereby allowing or preventing the passage of light.

For example, the layer where the heating electrode 15 is located is disposed between the second electrode layer I2 and the first metal layer M1, is spaced from the second electrode layer I2 in an insulation manner through the passivation layer 104, and is spaced from the first metal layer M1 in an insulation manner through the gate insulation layer 102. Further, a second metal layer (not shown) for arranging the data lines 12 can also be arranged between the layer where the heating electrode 15 is located and the first metal layer M1. The second metal layer is located between the gate insulation layer 102 and the layer where the heating electrode 15 is located, and is spaced from the layer where the heating electrode 15 is located in an insulation manner through an insulation interlayer 102'. The material of the heating electrode 15 may be, for example, metal or metal oxide, which is not limited in the embodiments of the present disclosure.

The heating electrode 15 includes a plurality of first strip heating electrodes 151 extending along the first direction D1 and arranged along the second direction D2. The first strip heating electrode 151 is located at the junction between the first branch electrode 141a and the second branch electrode 141b. The influence of introducing the heating electrode on the display effect may be reduced while realizing the purpose of heating. In other words, the introduction of the heating electrode does not reduce the area of the light-transmitting region, and thus the aperture ratio of the liquid crystal display panel will not be affected.

Figure 15:
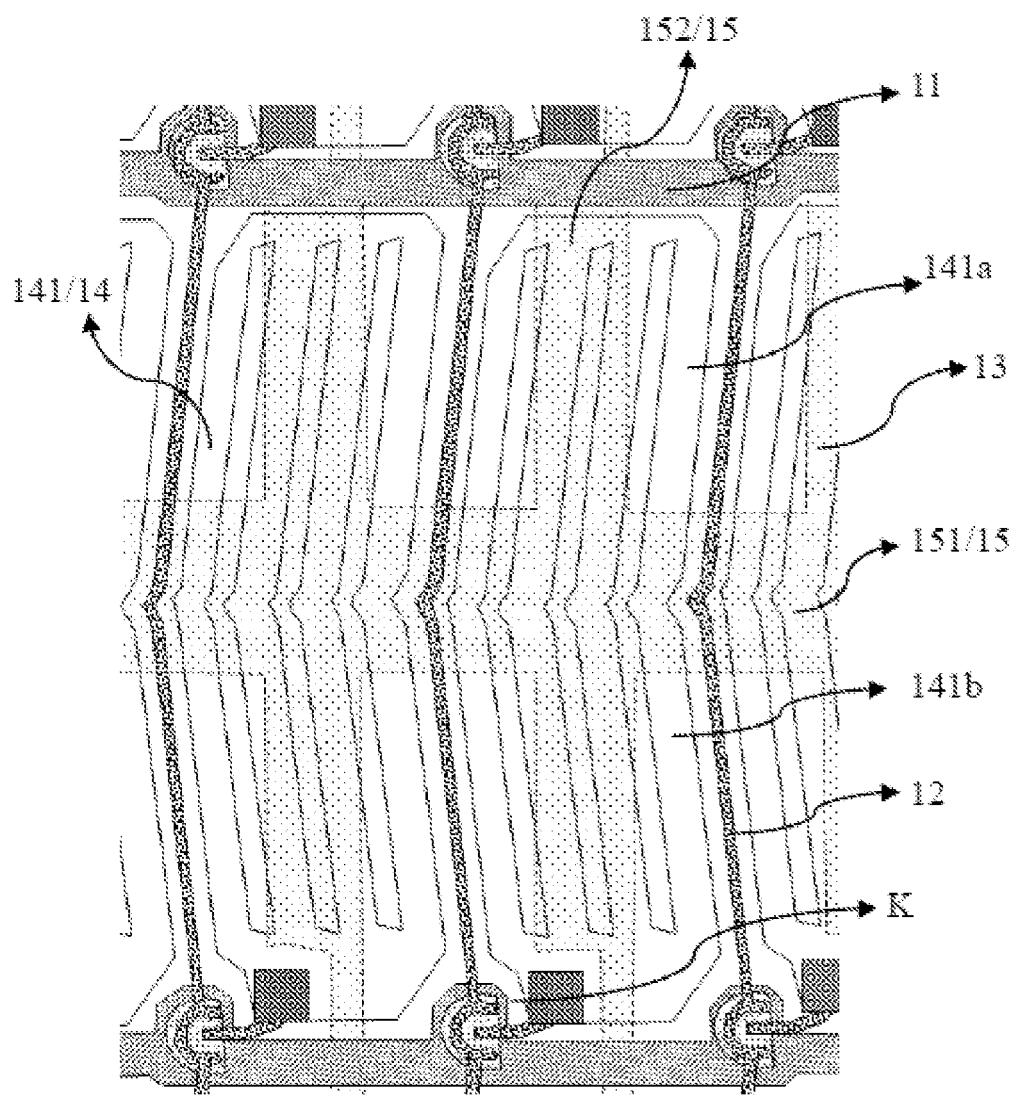
FIG. 15 is a schematic diagram of a first substrate according to yet another embodiment of the present disclosure.

FIG. 15 is a schematic diagram of a first substrate according to yet another embodiment of the present disclosure. The structure of the first substrate provided in this embodiment is similar to that of the first substrate as shown in FIGS. 11 and 12. That is, the second electrode layer is located between the first electrode layer and the first underlay, the first electrode layer includes a first electrode 14, the second electrode layer includes a second electrode 13, and the first electrode 14 includes a plurality of strip electrodes 141 to form a pseudo-dual-domain structure. The first substrate further includes a heating electrode 15 made of a transparent conductive material. For example, the transparent conductive material can be selected from a group consisting of indium tin oxide, indium zinc oxide, zinc oxide, aluminum zinc oxide, or combinations thereof. The layer where the heating electrode 15 is located is disposed between the second electrode layer and the first underlay. Under the shielding effect of the second electrode layer, the parallel electric field of the liquid crystal display panel will not be affected even if there is a coupling electric field between the heating electrode 15 and other conductive film layers. The difference lies in that the heating electrode 15 includes a plurality of first strip heating electrodes 151 extending along the first direction D1 and arranged along the second direction D2 and a plurality of second strip heating electrodes 152 extending along the second direction D2 and arranged along the first direction D1. The second strip heating electrodes 152 and the first strip heating electrodes 151 are formed in a same layer and are connected to each other to form a grid-like heating electrode, thereby increasing the area of the heating electrode and further improving the heating effect. Meanwhile, since the grid-like heating electrode is made of the transparent conductive material, the aperture ratio of the liquid crystal display panel will not be reduced.

Specifically, the first strip heating electrode 151 is located at the junction between the first branch electrode 141a and the second branch electrode 141b, extends along the junctions in a same row of sub-pixels and extends over the entire display area of the liquid crystal display panel. The second strip heating electrode 152 extends along a same column of sub-pixels and passes through each of the light-transmitting regions of this column of sub-pixels. Further, for example, a position where the second strip heating electrode 152 intersects the first strip heating electrode 151 is a center of the light-transmitting region of each sub-pixel so that the heating electrode is located in the coverage of the first electrode 14 or the second electrode 13 to the maximum, so that the heating electrode 15 is shielded by the first electrode 14 or the second electrode 13.

Further, a portion of the heating electrode 15 corresponding to the channel region of the display switch element K has a bypassing structure such that the heating electrode 15 will not overlap the channel region of the display switch element K, thereby preventing the heat generated by the electrode from directly acting on the channel region and preventing the performance of the display switch element from being impaired.

In an embodiment of the present disclosure, the first electrode is a pixel electrode, and the first electrode layer includes a plurality of pixel electrodes located in the plurality of sub-pixels, respectively. Each pixel electrode is connected to the drain electrode of the corresponding switch element for display. The second electrode is a common electrode for receiving a common signal. It is also possible that the first electrode is a common electrode, for example, a full-surface type, a plurality of strip electrodes are formed in each sub-pixel through slitting, and the second electrode is a pixel electrode. This is not limited in the embodiments of the present disclosure.

In the liquid crystal display panel provided in the embodiments of the present disclosure, the liquid crystal display panel includes a first substrate, a second substrate arranged opposite to the first substrate, and a liquid crystal layer sandwiched between the first substrate and the second substrate. A heating electrode is arranged at a side of the first substrate facing towards the second substrate, i.e., the heating electrode is arranged in the liquid crystal display panel. The heat generated by the heating electrode can directly act on the liquid crystal molecules in the liquid crystal layer, so as to realize a rapid start of the liquid crystal display panel and accelerate the response of the liquid crystal molecules in the liquid crystal layer in a low temperature environment can be improved, thereby ensuring the display quality of the liquid crystal display device, and solving the problems of too slow response of the liquid crystal display panel and liquid crystal display device when operating at a low temperature.

In the liquid crystal display panel provided by the embodiments of the present disclosure, the pixel electrode (or the common electrode) of the liquid crystal display panel is configured as a vertical domain structure or a horizontal domain structure, and the shape and position of the heating electrode is adapted to the vertical domain structure or the horizontal domain structure. With the above liquid crystal display panel, on one hand, the influence of introducing the heating electrode on the aperture ratio can be minimized while realizing the start and normal operation in a low temperature environment. On the other hand, the purpose of shielding the heating electrode can be realized by using the first electrode or the second electrode, so as to prevent the liquid crystal driving electric field of the liquid crystal display panel from being affected by the coupling capacitance between the heating electrode and other conductive film layers.

Figure 16:
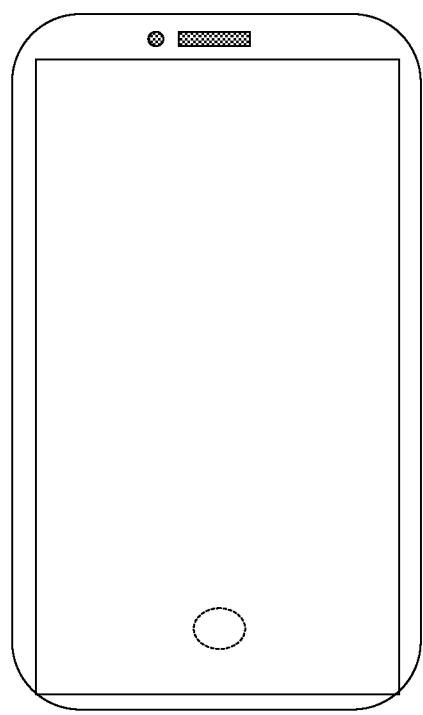
FIG. 16 is a schematic diagram of a liquid crystal display device according to an embodiment of the present disclosure.

An embodiment of the present disclosure also provides a liquid crystal display device that can normally start and operate in a low temperature environment. As shown in FIG. 16, the liquid crystal display device includes the above liquid crystal display panel and a housing. The housing forms a accommodating space for the display panel. The housing may be rigid or flexible, which is not limited in the present disclosure. It can be understood that, the display device provided by the embodiments of the present disclosure may be display devices having a display function, such as a computer, a television, an on-board display device, and the like, which are not limited in the present disclosure.

It should be noted that merely the preferred embodiments of the present disclosure and technical principles are described above. Those skilled in the art can understand that the present disclosure is not limited to the specific embodiments described herein, and can make various obvious changes, readjustments, and substitutions without departing from the scope of the present disclosure. Therefore, although the present disclosure has been described in detail through the above embodiments, the present disclosure is not limited to the above embodiments, and other equivalent embodiments may also be included without departing from the concept of the present disclosure. The scope of the present disclosure is determined by the scope of the appended claims.

What is claimed is:

1. A liquid crystal display panel, comprising: a first substrate, a second substrate arranged opposite to the first substrate, and a liquid crystal layer arranged between the first substrate and the second substrate,
   wherein the first substrate comprises:
   a first underlay;
   a plurality of gate lines and a plurality of data lines arranged on the first underlay, wherein the plurality of gate lines extends along a first direction and is arranged along a second direction, the plurality of data lines extends along the second direction and is arranged along the first direction, and the plurality of gate lines and the plurality of data lines intersect to define a plurality of sub-pixels;
   a first electrode layer comprising a first electrode, wherein in each of the plurality of sub-pixels, the first electrode comprises a plurality of strip electrodes that are parallel to one another;
   a second electrode layer comprising a second electrode, wherein the second electrode layer is located between the first electrode layer and the first underlay; and a heating electrode located at a side of the first underlay facing towards the liquid crystal layer,
   wherein the first substrate comprises a plurality of light-transmitting regions and a non-light-transmitting region around the plurality of light-transmitting regions, and the plurality of gate lines and the plurality of data lines are located in the non-transmitting region,
   wherein at least a portion of the heating electrode is located in the plurality of light-transmitting regions, and a layer where the heating electrode is located is disposed between the second electrode layer and the first underlay,
   wherein in each of the plurality of sub-pixels, each of the plurality of strip electrodes comprises a first branch electrode and a second branch electrode connected to each other,
   wherein an angle β2 between an extending direction of the first branch electrode and the first direction satisfies 45°<β2<90°, the second branch electrode and the first branch electrode are symmetrical with respect to the first direction, and a first corner is formed at a junction between the first branch electrode and the second branch electrode of a same strip electrode of the plurality of strip electrodes, and
   wherein the heating electrode comprises a plurality of first strip heating electrodes extending along the first direction and arranged along the second direction, and in a same row of sub-pixels, vertices of all first corners are located in a coverage of a same first strip heating electrode of the plurality of first strip heating electrodes.

2. The liquid crystal display panel according to claim 1, wherein the heating electrode is a metal electrode.

3. The liquid crystal display panel according to claim 2, wherein a portion of each of the plurality of data lines corresponding to a respective one of the plurality of sub-pixels comprises a first branch line and a second branch line connected to each other,
   wherein the first branch line is parallel to the first branch electrode, the second branch line is parallel to the second branch electrode, and a second corner is formed at a junction between the first branch line and the second branch line of a same data line of the plurality of data lines, and
   wherein in a same row of sub-pixels, vertices of all second corners and the vertices of all first corners are within the coverage of a same first strip heating electrode of the plurality of first strip heating electrodes.

4. The liquid crystal display panel according to claim 1, wherein the heating electrode is a transparent conductive electrode.

5. The liquid crystal display panel according to claim 4, wherein the heating electrode further comprises a plurality of second strip heating electrodes extending along the second direction and arranged along the first direction, and
   wherein the plurality of second strip heating electrodes and the plurality of first strip heating electrodes are formed in a same layer and are connected to each other.

6. The liquid crystal display panel according to claim 1, wherein the first electrode is a pixel electrode and the second electrode is a common electrode; or the second electrode is a pixel electrode, and the first electrode is a common electrode.

7. The liquid crystal display panel according to claim 1, wherein the liquid crystal display panel further comprises a heating control module, and the heating electrode is connected to a heating power interface of the heating control module.

8. The liquid crystal display panel according to claim 1, wherein the second substrate comprises a black matrix, and an orthographic projection of the black matrix on the first substrate overlaps the non-light-transmitting region.

9. A liquid crystal display device, comprising a liquid crystal display panel, wherein the liquid crystal display panel comprises a first substrate, a second substrate arranged opposite to the first substrate, and a liquid crystal layer arranged between the first substrate and the second substrate, wherein the first substrate comprises:

a first underlay;

a plurality of gate lines and a plurality of data lines arranged on the first underlay, wherein the plurality of gate lines extends along a first direction and is arranged along a second direction, the plurality of data lines extends along the second direction and is arranged along the first direction, and the plurality of gate lines and the plurality of data lines intersect to define a plurality of sub-pixels;

a first electrode layer comprising a first electrode, wherein in each of the plurality of sub-pixels, the first electrode comprises a plurality of strip electrodes that are parallel to one another;

a second electrode layer comprising a second electrode, wherein the second electrode layer is located between the first electrode layer and the first underlay; and a heating electrode located at a side of the first underlay facing towards the liquid crystal layer, wherein the first substrate comprises a plurality of light-transmitting regions and a non-light-transmitting region around the plurality of light-transmitting regions, and the plurality of gate lines and the plurality of data lines are located in the non-transmitting region, wherein at least a portion of the heating electrode is located in the plurality of light-transmitting regions, and a layer where the heating electrode is located is disposed between the second electrode layer and the first underlay, wherein in each of the plurality of sub-pixels, each of the plurality of strip electrodes comprises a first branch electrode and a second branch electrode connected to each other, wherein an angle $\beta$ between an extending direction of the first branch electrode and the first direction satisfies $45°<\beta<90°$, the second branch electrode and the first branch electrode are symmetrical with respect to the first direction, and a first corner is formed at a junction between the first branch electrode and the second branch electrode of a same strip electrode of the plurality of strip electrodes, and wherein the heating electrode comprises a plurality of first strip heating electrodes extending along the first direction and arranged along the second direction, and in a same row of sub-pixels, vertices of all first corners are located in a coverage of a same first strip heating electrode of the plurality of first strip heating electrodes.

* * * * *